United States Patent [19]

Sigai et al.

[11] Patent Number: 4,797,594
[45] Date of Patent: Jan. 10, 1989

[54] REPROGRAPHIC APERTURE LAMPS HAVING IMPROVED MAINTENANCE

[75] Inventors: A. Gary Sigai, Lexington; Fred R. Taubner, Danves, both of Mass.

[73] Assignees: GTE Laboratories Incorporated, Waltham; GTE Products Corporation, Danvers, both of Mass.

[21] Appl. No.: 929,694

[22] Filed: Nov. 12, 1986

Related U.S. Application Data

[63] Continuation-in-part of Ser. No. 718,095, Apr. 3, 1985, Pat. No. 4,710,674, which is a continuation-in-part of Ser. No. 607,865, May 7, 1984, abandoned, and Ser. No. 607,846, May 7, 1984, abandoned.

[51] Int. Cl.$^4$ .................. H01J 61/44; H01J 61/46
[52] U.S. Cl. .................. 313/488; 313/486; 313/489
[58] Field of Search .................. 313/486, 488, 489

[56] References Cited

U.S. PATENT DOCUMENTS

| | | |
|---|---|---|
| 2,151,496 | 3/1939 | Beese . |
| 2,238,784 | 4/1941 | Scott et al. . |
| 2,331,306 | 10/1943 | Casellini . |
| 2,386,277 | 10/1945 | Smith . |
| 2,586,304 | 2/1952 | Coltman . |
| 2,817,599 | 12/1957 | Edwards et al. . |
| 2,878,137 | 3/1959 | Butler et al. . |
| 2,892,956 | 6/1959 | Vodicka . |
| 2,920,003 | 1/1960 | Davis . |
| 2,971,859 | 2/1961 | Sisneros et al. . |
| 3,047,512 | 7/1962 | Martyny .................. 252/301.4 |
| 3,067,356 | 12/1962 | Ray . |
| 3,115,309 | 12/1963 | Spencer et al. .................. 313/488 X |
| 3,141,990 | 7/1964 | Ray . |
| 3,251,337 | 5/1966 | Latta et al. . |
| 3,408,223 | 10/1968 | Shortes et al. . |
| 3,549,412 | 12/1970 | Frey, Jr. et al. . |
| 3,599,029 | 8/1971 | Martyny . |
| 3,636,352 | 1/1972 | Wanmaker et al. . |
| 3,717,781 | 2/1973 | Sadoski et al. .................. 313/488 |
| 3,845,343 | 10/1974 | Hammer . |
| 3,875,449 | 4/1975 | Byler et al. . |
| 3,886,396 | 5/1975 | Hammer et al. . |

(List continued on next page.)

FOREIGN PATENT DOCUMENTS

| | | |
|---|---|---|
| 3408237 | 9/1985 | European Pat. Off. . |
| 85 104456.0 | 11/1985 | European Pat. Off. . |
| 2450435 | 4/1976 | Fed. Rep. of Germany . |
| 3032225 | 8/1980 | Fed. Rep. of Germany . |
| 50-98065 | 8/1975 | Japan . |
| 50-98057 | 8/1975 | Japan . |
| 50-98063 | 8/1975 | Japan . |
| 56-57247 | 5/1981 | Japan . |
| 61-91847 | 5/1986 | Japan . |
| 1343250 | 6/1972 | United Kingdom . |

OTHER PUBLICATIONS

Butler, "Fluorescent Lamp Phosphors", Pennsylvania State University Press, 1/80, p. 47.
Graff, "Washing Calcium Halophosphate Phosphors with Diethylenetriamine Pentaacetic Acid", Journal Electrochemical Society: Solid-State Science and Technology, 1/72, pp. 118–120.
D. Geldart, "Types of Gas Fluidization", Powder Technology, 7 (1973) 285–292.
I. A. Mezentseva, "Study of an Increase in the Stability of Halophosphate Luminophors by the Applications of (List continued on next page.)

Primary Examiner—Leo H. Boudreau
Assistant Examiner—K. Wieder
Attorney, Agent, or Firm—Martha Ann Finnegan

[57] ABSTRACT

An improved aperture fluorescent reprographic lamp is disclosed. The lamp of the present invention includes an elongated envelope containing an ionizable medium including mercury and having electrodes at each end of the envelope: a reflector layer on a major portion of the inner surface of the envelope, a phosphor layer disposed on and coextensive with the reflector layer, and a protective coating over at least the portion of the inner surface of the lamp envelope not covered with the reflector layer. The phosphor layer comprises particles of green-emitting zinc orthosilicate phosphor which are individually coated with a non-particulate, conformal aluminum oxide coating.

16 Claims, 1 Drawing Sheet

U.S. PATENT DOCUMENTS

| | | |
|---|---|---|
| 3,923,682 | 12/1975 | Dale et al. . |
| 3,963,639 | 6/1976 | Klein . |
| 3,984,587 | 10/1976 | Lipp . |
| 3,995,191 | 11/1976 | Kaduk et al. . |
| 3,995,192 | 11/1976 | Hammer . |
| 4,058,639 | 11/1977 | Schreurs . |
| 4,079,288 | 3/1978 | Maloney et al. . |
| 4,208,448 | 6/1980 | Panaccione . |
| 4,231,892 | 11/1980 | Chang et al. . |
| 4,243,909 | 1/1981 | Brecher . |
| 4,287,229 | 9/1981 | Wantanabe et al. . |
| 4,289,991 | 9/1981 | Schreurs . |
| 4,339,501 | 7/1982 | Inoue et al. . |
| 4,396,863 | 8/1983 | Ranby et al. . |
| 4,440,800 | 4/1984 | Morton et al. . |
| 4,459,507 | 7/1984 | Flaherty . |
| 4,473,634 | 9/1984 | Dodds et al. . |
| 4,505,720 | 3/1985 | Gabor et al. . |
| 4,515,827 | 5/1985 | Dodds et al. . |
| 4,551,397 | 11/1985 | Yaguchi et al. . |
| 4,585,673 | 4/1986 | Sigai . |
| 4,639,637 | 1/1987 | Taubner et al. . |
| 4,670,688 | 6/1987 | Sigai et al. . |
| 4,691,140 | 9/1987 | Sakakibara ............................ 313/486 |
| 4,710,674 | 12/1987 | Sigai ...................................... 313/489 |

(List continued on next page.)

Protective Coatings", SB. Nauch, TR. NVII Lyuminoforv I Osobo Chist. Vesh Ch Estv (D3RAP), 80(19): 27 (1980).

Chemical Abstract No. 79392d, vol. 82, 1975.

M. T. Duffy et al., "Chemical Vapor Deposition of Aluminum Oxide Films from Organo-Aluminum Compounds", R.C.A. Review, pp. 754–769 (Dec. 1970).

B. E. Yoldas et al., "Formation of Continuous Beta Alumina Films and Coatings at Low Temperatures", Ceramic Bulletin 59, 640 (1980).

Chemical Abstract No. 91:221327T.

W. Lehmann, "An Analysis of Color-Changing Penetration-Type Cathodoluminescent Phosphor Screens", J. Electrochem. Soc.: Solid State Science and Technology, 128(8): 1787 (1981).

REPROGRAPHIC APERTURE LAMPS HAVING IMPROVED MAINTENANCE

CROSS-REFERENCE TO RELATED APPLICATIONS

This application is a continuation-in-part of application Ser. No. 718,095 filed 3 April 1985, now U.S. Pat. No. 4,710,674, which is continuation-in-part Ser. No. 607,865 filed 7 May 1984, now abandoned. and Ser. No. 607,846, filed 7 May 1984, now abandoned.

BACKGROUND OF THE INVENTION

This invention relates to fluorescent lamps. More particularly, this invention relates to aperture fluorescent reprographic lamps.

An aperture fluorescent reprographic lamp is a high output or very high output type fluorescent lamp which is designed with a phosphor coating extending part way around the lamp and in such a manner as to leave a slot of clear glass along the length of the lamp. The slot of clear glass may extend the full length of the envelope as shown, for example, in FIG. 1 of U.S. Pat. No. 3,141,990 to J. G. Ray or, alternatively, may extend substantially the full length of the lamp envelope as shown in FIG. 1 of U.S. Pat. No. 3,886,396 to Hammer et al. The purpose of this construction is to concentrate a beam of light through the clear glass section.

Green-emitting zinc orthosilicate phosphor, also known by its mineral name willemite, was one of the earliest phosphors used for reprographic applications and is still used in some of the earlier photocopiers. The major limitation of this phosphor for reprographic applications lies in its severe degradation in emission with time of lamp operation, known as maintenance loss. Hence, alternative phosphors with better maintenance have been developed through the years, such as, for example, cerium terbium coactivated magnesium aluminate phosphor. Such better maintenance phosphors are, however, significantly more expensive than the green-emitting zinc orthosilicate phosphor because they employ costly rare-earth activators.

Efforts to improve the performance of green-emitting zinc orthosilicate phosphor in aperture lamps have included the use of overcoats, interfacial coats between the phosphor and glass, and the inclusion of additives such as $Sb_2O_3$ in the phosphor slurry suspension prior to lamp making. None of these modifications have had a major effect on improving lamp performance to the point of making them competitive with the more costly phosphor developed as replacements for willemite. For example, in U.S. Pat. No. 3,141,990 to J. G. Ray, an aluminum oxide interface is used in a reprographic lamp to prevent discoloration of the lamp glass. U.S. Pat. No. 3,599,029 to Martyny discloses the use of a double interfaced layer of $TiO_2$ and $Al_2O_3$ between the phosphor and glass to improve maintenance. Hammer and Kaduk, in U.S. Pat. No. 3,886,396, disclose the use of a 1 mm-particulate overcoat to improve maintenance. Kaduk and Hammer in U.S. Pat. No. 3,995,192, disclose use of an improved reflector layer containing titanium dioxide and up to 15 weight percent magnesium oxide beneath the phosphor. In U.S. Pat. No. 3,995,192 Hammer discloses an reflector layer containing titanium dioxide and up to 15 weight percent alumina.

Because a decrease in light output still occurs during the lifetime of an aperture fluorescent reprographic lamp, there still remains a significant need for additional improvement.

SUMMARY OF THE INVENTION

In accordance with the present invention there is provided an aperture fluorescent reprographic lamp comprising an elongated envelope containing an ionizable medium including mercury and having electrodes at each end of said envelope; a reflector layer on a major portion of the inner surface of said envelope; a phosphor layer disposed upon said reflector layer within said envelope said phosphor layer comprising particles of green-emitting zinc orthosilicate phosphor, said particles being individually coated with a non-particulate, conformal coating of aluminum oxide; and a protective coating over at least the portion of the inner surface of said envelope not covered with said reflector layer.

Figure 1:
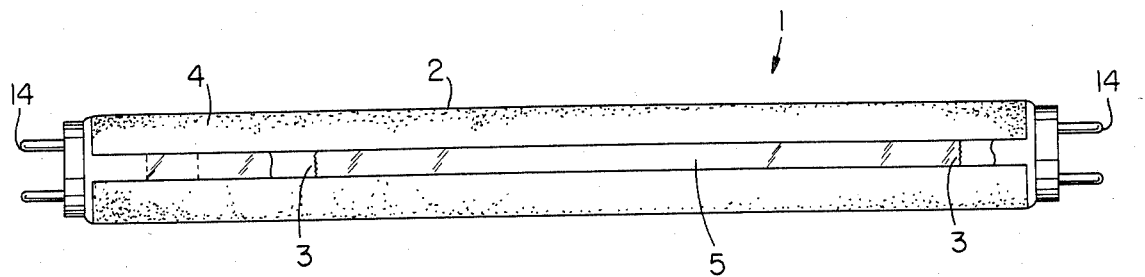
FIG. 1 is a diagrammatic elevational view of an aperture fluorescent reprographic lamp.

For a better understanding of the present invention, together with other and further objects, advantages, and capabilities thereof, reference is made to the following disclosure and appended claims in connection with the above described drawing.

DETAILED DESCRIPTION

In accordance with the present invention it has been found that the maintenance of aperture fluorescent reprographic lamps can be improved by employing a phosphor layer comprising particles of a green-emitting zinc orthosilicate phosphor which have been individually coated with a nonparticulate, conformal aluminum oxide coating.

As used herein, "green-emitting zinc orthosilicate phosphor" includes any phosphor having a zinc orthosilicate host matrix which is activated by at least manganese (II) ions, and which emits light having a wavelength of approximately 528–530 nm under 253.7 nanometer excitation. For example, "green-emitting zinc orthosilicate phosphor" is intended to include zinc orthosilicate phosphors having a matrix which may be stoichiometric or non-stoichiometric with respect to zinc, silicon, or oxygen, as well as those which may have a lattice defect. "Green-emitting zinc orthosilicate phosphor" is further intended to include such phosphor in which the zinc cation has been partially replaced by other cations. See, for example, U.S. Pat. No. 4,231,892 to Chang et al. or U.S. Pat. No. 4,551,397 to Yaguchi et al. Also intended to be included within the scope of "green-emitting zinc orthosilicate phosphors" as used herein is such phosphor which has one or more activators in addition to manganese (II).

Individually coated phosphor particles of the green-emitting zinc orthosilicate phosphor employed in the reprographic aperture lamp of the present invention have a conformal and continuous, i.e., nonparticulate, coating of aluminum oxide surrounding the outer surface of each phosphor particle. The coating substantially completely covers the outer surface of each coated particle. Preferably, the aluminum oxide coating has a coating of at least 90 Angstroms. Most preferably, the coating thickness is from about 100 to about 300

Angstroms. A coating thickness greater than 300 Angstroms may also be used.

The individually and continuously coated green-emitting zinc orthosilicate phosphor particles employed in the lamp of the present invention are prepared by depositing a continuous, nonparticulate, conformal, aluminum oxide coating on the outer surface of the individual phosphor particles. Such coating is applied by coating methods such as, for example, chemical vapor deposition or, preferably by chemical vapor deposition in a fluidized bed. Most preferably the continuously coated individual phosphor particles are prepared by the method described in U.S. Pat. No. 4,585,673, entitled "Method for Coating phosphor particles" by A. Gary Sigai, which issued on 29 April 1986, which is hereby incorporated herein by reference.

The following Example is given to enable those skilled in this art to more clearly understand and practice the present invention. The Example should not be considered as a limitation upon the scope of the invention but merely as being illustrative and representative thereof.

EXAMPLE particles of green-emitting, manganese-activated zinc orthosilicate phosphor Type No. 2285 obtained from the Chemical and Metallurgical Division of GTE products Corporation, Towanda, Pa. were coated with a nonparticulate, conformal coating of aluminum oxide using a coating similar to that method of the preferred embodiment of above-referenced U.S. Pat. No. 4,585,673.

Prior to coating, the phosphor powder was sieved through a 400 mesh screen and admixed with an Aluminum Oxide C fluidizing aid. (Aluminum Oxide C is manufactured by DeGussa, Inc.). The admixture contained 0.05 weight percent Aluminum Oxide C with respect to the phosphor. Four hundred grams of the admixture were loaded into a reactor designed in accordance with the schematic representation shown in FIG. 1 of U.S. Pat. No. 4,585,673.

The coating parameters were:

| | |
|---|---|
| Carrier Gas Flow ($N_2$) | 500 cc/min |
| Alkyl bubbler flow ($N_2$) | 150 cc/min |
| Oxygen carrier flow ($N_2$) | 50 cc/min |
| Oxygen flow | 500 cc/min |
| Frit area temperature | 200° C. |
| Bubbler temperature | 30° C. |
| Hot zone (highest temperature) | 550° C. |
| Coating time | 10¼ hours |

The coating precursor material was trimethyl aluminum. The calculated aluminum oxide ($Al_2O_3$) coating thickness was about 150 Angstroms. Most preferred coating thicknesses are from about 100 to about 300 Angstroms. The surface area of the uncoated phosphor was about 0.36 meter$^2$/gram, which is within the preferred range of 0.31–0.39 meter$^2$/gram.

High resolution SEM of coated phosphor particles shows that the aluminum oxide coating is conformal. The coating growth was enhanced where fluidizing aid particles had adhered to the phosphor particle surface during fluidizing and the coating process. Auger analysis confirmed complete coverage of the surface of the individual phosphor particles with the continuous aluminum oxide coating, within the limits of analysis (99.8%), based on the attenuation of the peak-to-peak height of the cations of the phosphor substrate.

"Continuous", as used herein to describe the aluminum oxide coating herein, means nonparticulate i.e., the aluminum oxide coating surrounding each phosphor particle does not consist of individual aluminum oxide particles.

The key features of the aluminum oxide coated phosphor particles of the present invention are: (1) the continuous, or nonparticulate, nature of the coating on each particle; (2) the conformal nature of the coating on each particle, replicating submicron features found naturally occurring on the uncoated phosphor particles; and (3) that each phosphor particle is individually coated.

These key features of the coated phosphor particle of the present invention are established and/or supported by Scanning Electron Microscopy (SEM); Auger analysis, reflection electron diffraction techniques and BET measurements.

Scanning electron microscopy of the coated particles shows that the particles are individually coated; that the aluminum oxide coating on the phosphor particles is continuous and does not consist of aluminum oxide particles; and that the coating is conformal, replicating the submicron features of the underlying phosphor particle.

Auger analysis indicates that the coating provides substantially complete coverage of the outer surface of the phosphor particle.

Reflection electron diffraction shows the aluminum oxide coating to be noncrystalline, i.e., amorphous.

BET measurements support the conformal and continuous nature of the aluminum oxide coating to the extent the surface area of the coated phosphor is not appreciably changed when compared to the surface area of the uncoated phosphor. If the coating were particulate in nature, the surface area of the coated phosphor would be significantly increased. BET measurements also support that the phosphor particles are individually coated.

An aperture fluorescent reprographic lamp in accordance with the present invention includes an envelope having electrodes seled into its ends, a fill of inert gas at a low pressure, a small quantity of mercury, a reflector layer deposited on a major portion of the inner surface of the lamp envelope and a phosphor layer deposited on and coextensive with the reflector layer. The phosphor layer comprises particles of green-emitting zinc orthosilicate, or synthetic willemite, phosphor which have been individually coated with a nonparticulate, conformal aluminum oxide coating.

The lamp also includes a protective coating on at least that portion of the inner surface of the envelope not coated with the reflector and coextensive phosphor layers. Such protective coating typically comprises a refractory oxide, for example, a clear coating of $TiO_2$ or submicron particle aluminum oxide, e.g., Aluminum Oxide C. (Manufactured by DeGussa, Inc.). It is important to note that the aperture should only be protectively coated to such an extent that the direct passage of light therethrough is not substantially affected and the tube remains transparent but still prevents attack of the glass by mercury vapor or mercury vapor compounds. In addition to being applied to the aperture, the protective coating can also be applied to the entire inner surface of the envelope, beneath the reflector layer. The protective coating can optionally also be applied over the reflector layer before the phosphor coating is applied, such that the protective coating is interposed between the reflector layer and phosphor layer.

Figure 2:
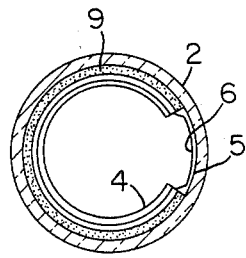
FIG. 2 is a cross-sectional view of an embodiment of the present invention.

An example of a preferred embodiment of the aperture fluorescent reprographic lamp of the present invention is illustrated in FIG. 1. In FIG. 1, the lamp 1 has a sealed hollow elongated vitreous soda lime silica glass tube or bulb 2 of circular cross section. It has the usual electrodes at each end supported on lead-in wires (not shown). Suitable terminals 14 are connected to the electrodes and project from the envelope 2. The sealed tube is filled with an inert gas such as argon or a mixture of inert gases, such as argon and neon, at a low pressure, for example 2 torr; and a small quantity of mercury is added, at least enough to provide a low vapor pressure of about six (6) microns during operation. The coating on the inner surface of the envelope of a preferred embodiment is shown in cross-section in FIG. 2. The inner surface of the glass tube is first coated with reflector layer 9 that is bonded tightly to the glass surface. An aperture, or opening 5 is mechanically scraped. A protective coating 6 is applied over the reflector layer 9 and over the aperture. A phosphor layer 4 comprising particles of green-emitting zinc orthosilicate phosphor individually coated with a nonparticulate, conformal aluminum oxide coating is coated over the portion of the protective coating which is disposed on the reflector layer 9, so as to leave the window clear of phosphor. The phosphor layer is coextensive with the reflector layer.

The reflector layer is preferably applied to the envelope by fully coating the lamp surface with a water base suspension of the desired reflector layer; mechanically scraping the aperture; and baking the remaining coatinq to remove the organic binder.

The phosphor coating is preferably applied to a lamp having an aperture the full length of the envelope by roll-coating the phosphor suspension over the reflector layer leaving the aperture window clear. The lamp is then baked to remove the organic binder.

The aperture utilized in the tube is to be determined by the amount of light derived. Aperture sizes can range, for example, from about 20° to about 90°. The brightness in the aperture area increases as the aperture width is reduced. A preferred aperture size is 45°.

LAMP TEST DATA

Conventional High Output (H.O.) 22.5 inch T8 aperture fluorescent reprographic lamps were fabricated with 45° apertures. The procedure used to fabricate the test lamps included the following steps:

(1) Each lamp was fully coated with a TiO$_2$ or Al$_2$O$_3$ reflector layer using a water base suspension system;

(2) A 45° aperture was mechanically scraped in each lamp;

(3) After the aperture was scraped, each lamp with the reflector coating was baked to remove the organic binder, i.e., poly(ethylene oxide), used in the water base suspension system;

(4) Each lamp was next fully coated with a protective coating of Aluminum Oxide C (manufactured by DeGussa, Inc.) using an organic base suspension and baked a second time;

(5) Each lamp was then roll-coated with an organic base suspension of the desired phosphor: the roll-coating was performed so as to leave the aperture window clear; and (6) Each lamp underwent a final bake and was then processed into a finished lamp using conventional fluorescent lamp manufacturing techniques.

The aluminum oxide reflector layer included aluminum oxide particles having an average particle size of about 0.85 micrometers and a surface area of about 4–6 meter$^2$/gram. The aluminum oxide reflector layer contained at least 95% by weight alpha-alumina. The aluminum oxide particles were High Purity Alumina Grade RC-HpT DBM obtained from Reynolds Metals Company—Chemical Division, Little Rock, Ark. (High Purity Alumina Grade RC-HpT DBM is 99.95% Al$_2$O$_3$).

Preferred layer weights for use in 22.5 inch T8 aperture fluorescent reprographic lamps fabricated as described by steps (1)-(6) are nominally: about 1.3–1.4 grams for a TiO$_2$ reflector layer; about 3.8–4.8 grams (or about 8.8–11.1 mg/cm$^2$) for a Al$_2$O$_3$ reflector layer; about 0.075–0.085 grams for the Al$_2$O$_3$ protective coating; and 1.7–2.2 grams of the aluminum oxide coated green-emitting zinc orthosilicate phosphor particles.

The lamp test data for three lamps fabricated as described in foregoing steps (1)-(6) are shown in Table I. The values listed for light output are in microwatts/cm$^2$.

Lamps I and II employed a layer of green-emitting zinc orthosilicate phosphor, Type No. 2285 obtained from the Chemical and Metallurgical Division of GTE products Corporation, Towanda, Pa. the individual particles of which were coated with a nonparticulate, conformal aluminum oxide coating in accordance with the method similar to that described in the Example, above. Lamp III employed a cerium terbium magnesium hexa-aluminate phosphor, Type No. 2293 obtained from the Chemical and Metallurgical Division of GTE products Corporation, Towanda, Pa.

A fourth aperture lamp, Lamp IV, employing a cerium-terbium magnesium aluminate phosphor and an alumina reflector layer was fabricated and separately tested. Lamp IV was also a 22.5 inch T8 aperture lamp and was fabricated by a method including steps similar to steps (1)-(6) described above. The cerium terbium magnesium hexaluminate phosphor employed was Type No. 2293 obtained from the Chemical and Metallurgical Division of GTE products Corporation, Towanda, Pa. The maintenance data for Lamp IV is set forth in Table II.

A comparison of the 300 hour maintenance data for Lamp I (a lamp in accordance with the present invention) and Lamp III (a lamp utilizing cerium terbium magnesium aluminate) shows that a lamp in accordance with the present invention has maintenance properties comparahle to those of an aperture lamp employing cerium terbium magnesium aluminate phosphor.

A gross comparison of the performance data for Lamp II and separately tested Lamp IV also shows that an aperture lamp employing a phosphor comprising green-emitting zinc orthosilicate phosphor, the individual particles of which are surrounded with a nonparticulate conformal aluminum oxide coating, has maintenance properties comparable to those of an aperture lamp employing rare-earth activated green-emitting phosphors which heretofore have been conventionally used in commercially available aperture lamps.

TABLE I

|  | Refl. | Refl. Wt. (Gms) | Phosphor Optical Density | Phosphor Wt. (Gms) | 1 Hour | 100 Hours | %M 1-100 | 300 Hours | %M 1-300 | 1000 Hours | %M 1-1000 |
| --- | --- | --- | --- | --- | --- | --- | --- | --- | --- | --- | --- |
| Lamp I | TiO$_2$ | 1.35 | 78.5 | 1.72 | 90.4 | 83.2 | 92.1 | 76.4 | 84.6 | Discontinued | — |
| Lamp II | Al$_2$O$_3$ | 4.5 | 78.7 | 2.08 | 112.9 | 111.7 | 98.9 | 109.3 | 96.8 | 100.8 | 89.4 |
| Lamp III | TiO$_2$ | 1.35 | 79.8 | 1.87 | 111.6 | 105.9 | 94.9 | 100.8 | 90.3 | 92.9 | 83.2 |

TABLE II

|  | Refl. | Refl. Wt. (Gms) | Phosphor Optical Density | Phosphor Wt. (Gms) | 1 Hour | 100 Hours | %M 1-100 | 300 Hours | %M 1-300 | 1000 Hours | %M 1-1000 |
| --- | --- | --- | --- | --- | --- | --- | --- | --- | --- | --- | --- |
| Lamp IV | Al$_2$O$_3$ | 4.5 | 79.6 | 2.03 | 140.1 | 138.9 | 99.1 | 139.1 | 99.3 | Discontinued | — |

The data in Table I unexpectedly shows that a lamp in accordance with the present invention including an alumina reflector layer has maintenance characteristics superior to those of an aperture lamp employing cerium terbium magnesium aluminate phosphor with a titanium dioxide reflector layer which heretofore have been used in the typical commercially available aperture lamp.

An aperture lamp in accordance with the present invention exhibits maintenance characteristics suitable for use in a commercial aperture lamp, while providing a substantial cost advantage over the cost of existing reprographic lamps which are commercially available. This cost advantage results from the fact that the major controlling cost in the manufacture of the reprographic lamp is the cost of the phosphor.

While there have been shown and described what are considered preferred embodiments of the present invention, it will be apparent to those skilled in the art that various changes and modifications may be made therein without departing from the invention as defined by the appended claims.

What is claimed is:

1. An aperture fluorescent reprographic lamp comprising:
   an elongated envelope containing an ionizable medium including mercury and having electrodes at each end of said envelope;
   a reflector layer on a major portion of the inner surface of said envelope;
   a phosphor layer disposed upon said reflector layer within said envelope, said phosphor layer comprising particles of green-emitting zinc orthosilicate phosphor, said particles being individually coated with a non-particulate, conformal coating of aluminum oxide; and
   a protective coating over at least the portion of the inner surface of said envelope not covered with said reflector layer.

2. An aperture fluorescent reprographic lamp in accordance with claim 1 wherein the phosphor particles are individually coated with a non-particulate, conformal aluminum oxide coating of a thickness from about 90 to about 300 Angstroms.

3. An aperture fluorescent reprographic lamp in accordance with claim 1 wherein said reflector layer comprises titanium dioxide.

4. An aperture fluorescent reprographic lamp in accordance with claim 1 wherein said reflector layer comprises aluminum oxide.

5. An aperture fluorescent reprographic lamp in accordance with claim 4 wherein said protective coating comprises aluminum oxide particles having an average particle size of about 0.85 micrometers.

6. An aperture fluorescent reprographic lamp in accordance with claim 1 wherein said protective coating covers the portion of the inner surface of said envelope not covered with said reflector layer and further covers said reflector layer, said protective coating being interposed between said reflector layer and said phosphor layer.

7. An aperture fluorescent reprographic lamp comprising:
   an elongated vitreous glass envelope containing an ionizable medium including mercury and having electrodes at each end of said envelope; a reflector layer on a major portion of the inner surface of the envelope;
   a protective coating comprising submicron particle aluminum oxide disposed on the reflector layer and upon the portion of the inner surface of said envelope not covered with said reflector layer; and
   a phosphor layer disposed on the reflector layer having said protective coating thereon, said phosphor layer comprising particles of green-emitting zinc orthosilicate phosphor, said particles being individually coated with a non-particulate, conformal coating of aluminum oxide, said coating having a thickness of about 90 to about 300 Angstroms.

8. An aperture fluorescent reprographic lamp in accordance with claim 7 wherein the reflector layer comprises titanium dioxide.

9. An aperture fluorescent reprographic lamp comprising:
   an elongated envelope containing an ionizable medium including mercury and having electrodes at each end of said envelope;
   an aluminum oxide reflector layer on a major portion of the inner surface of said envelope;
   a phosphor layer disposed upon said reflctor layer within said envelope, said phosphor layer comprising particles of green-emitting zinc orthosilicate phosphor, said particles being individually coated with a non-particulate, conformal coating of aluminum oxide; and
   a protective coating over at least the portion of the inner surface of said envelope not covered with said reflector layer.

10. An aperture fluorescent reprographic lamp in accordance with claim 9 wherein said aluminum oxide reflector layer has a coating weight of about 8.8 to about 11.1 milligrams/square centimeter.

11. An aperture fluorescent reprographic lamp in accordance with claim 9 wherein said aluminum oxide reflector layer comprises particles of aluminum oxide having a surface area of about 4 to about 6 meter$^2$/gram.

12. An aperture fluorescent reprographic lamp in accordance with claim 11 wherein the aluminum oxide particles have a median particle size of about 0.85 micrometers.

13. An aperture fluorescent reprographic lamp comprising:
   an elongated vitreous glass envelope containing an ionizable medium including mercury and having electrodes at each end of said envelope;
   an aluminum oxide reflector layer on a major portion of the inner surface of the envelope;
   a protective coating comprising submicron particle aluminum oxide disposed on the reflector layer and upon the portion of the inner surface of said envelope not covered with said reflector layer; and
   a phosphor layer disposed on the reflector layer having said protective coating thereon, said phosphor layer comprising particles of green-emitting zinc orthosilicate phosphor, said particles being individually coated with a non-particulate, conformal coating of aluminum oxide, said coating having a thickness of about 90 to about 300 Angstroms.

14. An aperture fluorescent reprographic lamp in accordance withi claim 13 wherein said aluminum oxide reflector layer has a coating weight of about 8.8 to about 11.1 milligrams/square centimeter.

15. An aperture fluorescent reprographic lamp in accordance with claim 13 wherein said aluminum oxide reflector layer comprises particles of aluminum oxide having a surface area of about 4 to about 6 meter$^2$/gram.

16. An aperture fluorescent reprographic lamp in accordance with claim 15 wherein the aluminum oxide particles have a median particle size of about 0.85 micrometers.

* * * * *